(12) United States Patent
Galindo Perez et al.

(10) Patent No.: US 11,617,237 B2
(45) Date of Patent: Mar. 28, 2023

(54) COOKING APPLIANCE

(71) Applicant: BSH Hausgeräte GmbH, Munich (DE)

(72) Inventors: Juan Jose Galindo Perez, Saragossa (ES); Sergio Llorente Gil, Saragossa (ES); Maria del Carmen Martinez Mur, Saragossa (ES); Dan Neumayer, Bernau (DE); Carlos Obon Abadia, Saragossa (ES); Jose Manuel Palacios Gasos, Saragossa (ES); Enrique Javier Perez Visa, Saragossa (ES); Edgar Jorge Ramirez Laboreo, Saragossa (ES); Fernando Sanz Serrano, Calamocha (ES)

(73) Assignee: BSH Hausgeräte GmbH, Munich (DE)

( * ) Notice: Subject to any disclaimer, the term of this patent is extended or adjusted under 35 U.S.C. 154(b) by 570 days.

(21) Appl. No.: 16/466,309

(22) PCT Filed: Dec. 12, 2017

(86) PCT No.: PCT/IB2017/057834
§ 371 (c)(1),
(2) Date: Jun. 4, 2019

(87) PCT Pub. No.: WO2018/116066
PCT Pub. Date: Jun. 28, 2018

(65) Prior Publication Data
US 2019/0313485 A1 Oct. 10, 2019

(30) Foreign Application Priority Data
Dec. 23, 2016 (ES) ................ ES201631668

(51) Int. Cl.
*H05B 6/12* (2006.01)
*A21B 1/02* (2006.01)
(Continued)

(52) U.S. Cl.
CPC ............. *H05B 6/129* (2013.01); *A21B 1/02* (2013.01); *F24C 7/085* (2013.01); *H05B 6/645* (2013.01); *H05B 2213/07* (2013.01)

(58) Field of Classification Search
CPC .... H05B 6/129; H05B 6/645; H05B 2213/07; A21B 1/02
(Continued)

(56) References Cited

U.S. PATENT DOCUMENTS 3,790,735 A * 2/1974 Peters, Jr. ............. H05B 6/129
219/622
5,595,673 A 1/1997 Ekstroem
(Continued)

FOREIGN PATENT DOCUMENTS

CH 697855 B1 2/2012
CN 102563727 A 7/2012
DE 102005003944 A1 11/2006

OTHER PUBLICATIONS

National Search Report CN 201780079827.8 dated Mar. 22, 2021.
(Continued)

*Primary Examiner* — Thien S Tran
(74) *Attorney, Agent, or Firm* — Michael E. Tschupp; Andre Pallapies; Brandon G. Braun

(57) ABSTRACT

A cooking appliance device, in particular induction cooking appliance device, includes a muffle which has a muffle wall and is configured to define at least partially a cooking chamber. A heating element is provided to heat the muffle wall, with a first sensor unit detecting a temperature of the muffle wall.

15 Claims, 2 Drawing Sheets

(51) Int. Cl.
*F24C 7/08* (2006.01)
*H05B 6/64* (2006.01)

(58) Field of Classification Search
USPC .................. 219/50, 391, 601, 624, 628, 756
See application file for complete search history.

(56) References Cited

U.S. PATENT DOCUMENTS

| | | | |
|---|---|---|---|
| 5,872,351 A | 2/1999 | Sowerby | |
| 6,384,380 B1* | 5/2002 | Fanes, Jr. ............. | A61G 12/001 |
| | | | 219/385 |
| 2005/0242086 A1* | 11/2005 | Imura ................ | G06K 19/0717 |
| | | | 219/627 |
| 2012/0103966 A1 | 5/2012 | Gladhill et al. | |
| 2013/0156906 A1 | 6/2013 | Raghavan | |
| 2014/0220196 A1* | 8/2014 | Veloo ........................ | A23L 5/10 |
| | | | 426/233 |
| 2016/0327279 A1 | 11/2016 | Bhogal et al. | |

OTHER PUBLICATIONS

National Search Report ES P201631668 dated Feb. 21, 2017.
International Search Report PCT/IB2017/057834 dated Mar. 14, 2018.

\* cited by examiner

COOKING APPLIANCE

CROSS-REFERENCES TO RELATED APPLICATIONS

This application is the U.S. National Stage of International Application No. PCT/IB2017/057834, filed Dec. 12, 2017, which designated the United States and has been published as International Publication No. WO 2018/116066 A1 and which claims the priority of Spanish Patent Application, Serial No. P201631668, filed Dec. 23, 2016, pursuant to 35 U.S.C. 119(a)-(d).

BACKGROUND OF THE INVENTION

The invention relates to a cooking appliance device and a method for operating a cooking appliance device.

A cooking appliance device which has a muffle with five muffle walls is known from the prior art. The muffle defines a cooking chamber together with a cooking appliance door. A sensor unit is arranged within the cooking chamber, which detects a temperature of the cooking chamber in an operating status. A control unit operates a heating element depending upon the temperature of the cooking chamber.

BRIEF SUMMARY OF THE INVENTION

The object of the invention is in particular to provide a generic device with improved properties in respect of operating convenience.

A cooking appliance device, in particular an induction cooking appliance device and advantageously an oven appliance device, is proposed with at least one muffle, which has at least one muffle wall and defines at least one cooking chamber at least partially, with at least one heating element, which is provided for heating the muffle wall, and with at least one sensor unit, which is provided for detection of at least one temperature of the muffle wall.

A "cooking appliance device", in particular an "induction cooking appliance device" and advantageously an "induction oven device" should in particular be understood to mean a part, in particular a subassembly of a cooking appliance, in particular of an induction cooking appliance and advantageously of an induction oven. For example a cooking appliance having the cooking appliance device could be embodied as a grill appliance and/or as a steam cooking appliance and/or as a microwave appliance.

An "induction cooking appliance", in particular an "induction oven", should in particular be understood to mean a cooking appliance, in particular an oven, which has at least one inductive operating status and in particular could have at least one operating status in addition to the inductive operating status, which diverges from inductive heating, such as for example at least one resistance-heated operating status.

The muffle wall could for example be a muffle rear wall and/or at least a muffle side wall and/or preferably at least a muffle top wall and/or preferably at least a muffle bottom wall. The muffle defines the cooking chamber in particular at least partially and advantageously in at least one operating status together with at least one appliance door of the cooking appliance device at least essentially. The cooking appliance device has in particular at least one appliance door, which at least partially defines the cooking chamber in at least one operating status. The cooking chamber is in particular provided for loading items to be cooked, such as for example foodstuffs, for heating and/or warming and/or keeping warm the item to be cooked. In particular the muffle wall is a wall delimiting the cooking chamber at least on one side.

The cooking appliance device has in particular at least one cooking appliance rear wall. The cooking appliance rear wall is in particular at least essentially and advantageously arranged completely within the cooking chamber. The cooking appliance rear wall is in particular arranged in the vicinity of at least one muffle wall embodied as a muffle rear wall.

In this connection, a "heating element" should in particular be understood to mean an element which is provided to convert energy, preferably electrical energy, into heat and to feed this in particular to at least one object to be heated. The object to be heated is in particular the muffle wall. In addition, the object to be heated could for example be an item of cookware located and/or placed in the cooking chamber.

In this connection, a "sensor unit" should in particular be understood to mean a unit which has at least one detector for the detection of at least one sensor parameter and which is provided, to output a value identifying the sensor parameter, wherein the sensor parameter advantageously takes the form of a physical and/or chemical variable. In particular the sensor parameter is at least one temperature of the muffle wall.

The detector could for example be a resistance sensor, such as in particular an NTC sensor and/or a PTC sensor and in particular have a temperature-dependent electrical resistance, based upon which the sensor parameter in particular could be detectable. Alternatively or additionally the detector could for example be an infrared sensor provided for detection of infrared radiation. Alternatively or additionally the detector could for example be a thermocouple and/or a radiation thermocouple. The detector could alternatively or additionally for example be a resistance thermometer.

The sensor unit could in particular have at least one further detector, which in particular could be provided for the detection of at least one further sensor parameter. For example the further sensor parameter could be at least one humidity of at least one fluid located in the cooking chamber and/or at least one flow rate of at least one fluid located in the cooking chamber and/or at least one temperature of at least one fluid located in the cooking chamber and/or at least one temperature of at least one item to be cooked located in the cooking chamber. Alternatively or additionally the further detector could be part of at least one second sensor unit and/or at least one third sensor unit and/or at least one fourth sensor unit. The fourth sensor unit could for example have at least one further detector, which could be provided for the detection of a humidity of at least one fluid located in the cooking chamber, and which could in particular be embodied as a Lambda sensor. Alternatively or additionally the fourth sensor unit could for example have at least one further detector, which could be provided for detection of a flow rate of at least one fluid located in the cooking chamber.

The word "provided" should in particular be understood to mean specially programmed, designed and/or equipped. That an object is provided for a particular function should in particular be taken to mean that the object fulfills and/or performs this particular function in at least one usage and/or operating status.

By means of the inventive embodiment a high level of operating convenience can in particular be achieved. In particular efficient execution of at least one cooking process, such as for example a grill cooking process, can be enabled. New-style operating modes and/or cooking functions can in particular be provided. The sensor unit can in particular be used for safety purposes, such as for example to avoid overheating of the muffle wall and thus in particular to prevent at least damage to the muffle wall and/or to enamel arranged on the muffle wall. Through the detection of the temperature of the muffle wall the determining of a power output based upon thermal radiation can in particular be enabled.

It is further recommended that the sensor unit is provided to detect the temperature of the muffle wall at the hottest point of the muffle wall. The sensor unit could for example be arranged at least in the vicinity of the hottest point of the muffle wall in at least one operating status, in order in particular to detect the temperature of the muffle wall at this point. The sensor unit could for example have at least one detector embodied as a resistance sensor, which could be arranged in the vicinity of the hottest point of the muffle wall and could detect the temperature at the hottest point of the muffle wall through a change in its resistance. Alternatively or additionally the sensor unit could be arranged at a distance from the hottest point of the muffle wall. In particular the sensor unit could have at least one detector embodied as an infrared sensor, which could detect at least one level of infrared radiation emanating from the hottest point of the muffle wall in at least one operating status, in order in particular to detect the temperature of the muffle wall at this point. The sensor unit could for example be arranged in direct contact with the muffle wall and in particular be fixed in this position on the muffle wall. The sensor unit could for example alternatively or additionally be welded onto the muffle wall. The muffle wall can thereby in particular be heated to a maximum temperature and at the same time damage to the muffle wall, in particular to enamel arranged on the muffle wall, and/or overheating can be prevented.

The heating element could for example be embodied as a resistance heating element. The heating element is preferably embodied as an induction heating element. In particular the heating element embodied as an induction heating element is provided to generate an electromagnetic alternating field in particular with a frequency between 17 kHz and 150 kHz. The heating element embodied as an induction heating element is in particular provided to generate heat, by means of the electromagnetic alternating field generated by the induction heating element, in at least one, in particular metallic, preferably ferromagnetic, object to be heated through eddy current induction and/or demagnetization effects, in particular through the conversion of the electromagnetic alternating field in the object to be heated into heat. The heating element embodied as an induction heating element is in particular wound into an in particular flat coil and has in particular at least three, advantageously at least five, particularly advantageously at least eight, preferably at least twelve and particularly preferably a multiplicity of windings. A particularly high level of operating convenience can thereby in particular be provided. In particular a rapid and/or optimal heating of the muffle wall can be enabled.

The cooking appliance device could for example have only the heating element embodied as an induction heating element and/or in particular, in addition to the heating element embodied as an induction heating element, exclusively further heating elements embodied as induction heating elements. The cooking appliance device preferably has at least one further heating element, which is embodied as a resistance heating element. In particular the heating element embodied as a resistance heating element has at least one heating conductor, which in particular is provided to conduct electrical current in at least one operating mode. In particular the heating element embodied as a resistance heating element is provided to heat and/or warm up at least one object to be heated, depending upon the strength of the electrical current conducted by the heating conductor, by means of a heating-up of the heating conductor as a result of the electrical current it conducts. The cooking appliance device has in particular at least one fan unit. In particular the fan unit is arranged at least in the vicinity of the heating element embodied as a resistance heating element and is in particular provided to distribute heated air from the heating element embodied as a resistance heating element in the cooking chamber and/or to introduce it into the cooking chamber. A cost-effective embodiment can in particular thereby be enabled. In combination with at least one heating element embodied as an induction heating element a high degree of diversity and/or flexibility of operating modes and/or cooking processes can in particular be provided.

It is further recommended that the cooking appliance device has at least a second sensor unit, which is provided for detection of at least one temperature within the cooking chamber and which in particular is arranged at least essentially and advantageously completely within the cooking chamber. The second sensor unit is in particular provided to detect a temperature of at least one fluid located in the cooking chamber. The fluid located in the cooking chamber is in particular air located in the cooking chamber. In particular a particularly optimal regulation of certain cooking processes, such as for example a hot air cooking process, can thereby be achieved.

It is in addition recommended that the cooking appliance device has at least a third sensor unit, which is provided for the detection of at least one temperature of at least one item to be cooked located within the cooking chamber. In particular the sensor unit could have at least one detector, which could be provided for insertion into the item to be cooked and which in particular in at least one operating status could be arranged at least partially within the item to be cooked. Alternatively or additionally the sensor unit could have at least one detector embodied as an infrared sensor, which in particular could be provided for the detection of infrared radiation in particular emitted by the item to be cooked, in order to detect a temperature of the item to be cooked located within the cooking chamber. A particularly optimal cooking result can thereby in particular be achieved.

It is furthermore recommended that the cooking appliance device has at least one control unit, which is provided to determine the power output directed onto the item to be cooked located within the cooking chamber, depending upon the temperature detected by the sensor unit. In particular the power output directed onto the item to be cooked located within the cooking chamber could be a thermal output, which in particular could be given off and/or generated and/or provided by the heating element and/or by the further heating element. Alternatively or additionally the power output directed onto the item to be cooked located within the cooking chamber could advantageously be radiated power output. A "control unit" should in particular be understood to mean an electronic unit, which is preferably at least partially integrated into a control and/or regulation unit of a cooking appliance and is preferably provided to control and/or regulate at least the heating element. The control unit preferably comprises an arithmetic unit and in particular in addition to the arithmetic unit a memory unit with a control and/or regulation program stored therein, which is provided to be performed by the arithmetic unit. The control unit could determine the power output directed onto the item to be cooked located within the cooking chamber for example by comparing the temperature detected by the sensor unit with at least one reference value stored in the memory unit. The reference value could for example be stored in the memory unit in tabular form and/or in the form of at least one dependency. Alternatively or additionally the control unit for determining the power output directed onto the item to be cooked located within the cooking chamber could perform at least one arithmetic operation and/or solve at least one mathematical equation. In particular the control unit is provided to control and/or regulate a temperature of the muffle wall, in particular by operating the heating element, depending upon the temperature detected by the sensor unit. The control unit is in particular provided to take account of different types of item to be cooked and/or different positions of the item to be cooked within the cooking chamber and/or different insertion levels of the item to be cooked within the cooking chamber during the control and/or regulation of the temperature of the muffle wall. In particular a high level of operating convenience can thereby be achieved. In particular an optimal regulation of the power output directed onto the item to be cooked and/or an optimal cooking result can be enabled, and in fact in particular independently of further variables, such as for example the nature of the item to be cooked and/or of objects located in the cooking chamber and/or of the position of at least one sensor unit within the cooking chamber. A browning level of the item to be cooked can in particular be optimally set and/or influenced on the basis of the power output directed onto the item to be cooked, for example in the case of an item to be cooked embodied as a pizza.

The control unit could for example be provided to determine the power output directed onto the item to be cooked located within the cooking chamber in each operating mode, depending upon the temperature detected by the same sensor unit. The control unit is preferably provided to determine the power output directed onto an item to be cooked located within the cooking chamber in different operating modes, depending upon temperatures detected by different sensor units. In particular the control unit is provided to take account of different types of power output directed onto the item to be cooked when determining the power output directed onto the item to be cooked located within the cooking chamber. One type of power output directed onto the item to be cooked could for example be power output based upon convection and/or power output based upon thermal radiation and/or power output based upon thermal conduction. In particular the control unit is provided to determine, when determining the power output directed onto the item to be cooked located within the cooking chamber, at least one power output based upon convection and/or power output based upon thermal radiation and/or power output based upon thermal conduction, and in particular to differentiate these from each other. In particular the control unit is provided to take account of the temperature detected by the second sensor unit and/or the temperature detected by the third sensor unit when determining the power output directed onto the item to be cooked located within the cooking chamber. In particular different proportions of the power output directed onto the item to be cooked can thereby be estimated, such as for example the proportion of power output based upon convection and/or the proportion of power output based upon thermal radiation, and namely in particular by comparison with an embodiment in which only the total power output directed onto the item to be cooked can be estimated. In particular an operator can select at least one operating mode, in which in particular as well as a temperature within the cooking chamber, the control unit likewise estimates different proportions of the power output directed onto the item to be cooked, by means of which a particularly high level of operating convenience can be achieved, in particular by comparison with an embodiment in which an operator must in particular select a predefined combination of heating element and fan unit. In particular the evaporation of water, which is in particular is highly dependent upon the type of power output directed onto the item to be cooked, can be particularly effectively monitored and/or regulated, and in fact even more so if at least one sensor unit has at least one moisture sensor.

It is in addition recommended that the control unit is provided to take account of the emissivity of the muffle wall when determining the power output directed onto an item to be cooked located within the cooking chamber. In particular the muffle wall and/or a coating of the muffle wall has an emissivity of at least 0.8, in particular at least 0.85, advantageously at least 0.9, particularly advantageously at least 0.95 and preferably at least 0.97. For example the muffle wall and/or a coating of the muffle wall could be at least essentially a black body and in particular have an emissivity of at least 0.99. In particular the muffle wall could have at least one coating, which could in particular consist at least for the most part of enamel. The emissivity of an object is in particular an emission ratio of the object. The power output directed onto the item to be cooked located within the cooking chamber can thereby in particular be determined in a particularly precise manner.

A particularly high level of operating convenience can in particular be achieved by a cooking appliance, in particular by an induction cooking appliance and advantageously by an induction oven, with at least one inventive cooking appliance device, in particular with at least one inventive induction cooking appliance device and advantageously with at least one inventive induction oven device.

Operating convenience can in particular be further increased by a method for operating an inventive cooking appliance device, in particular an inventive induction cooking appliance device and advantageously an inventive induction oven device, with at least one muffle wall and with at least one heating element, which is provided for heating the muffle wall, wherein in at least one operating status a temperature of the muffle wall is measured.

The cooking appliance device should here not be limited to the application and embodiment described above. In particular the cooking appliance device can have a number of individual elements, components and units diverging from the number cited herein in order to fulfill the functionality described herein.

Further advantages emerge from the following description of the drawing. The drawing shows an exemplary embodiment of the invention. The drawing, the description and the claims contain numerous features in combination. The person skilled in the art will expediently also consider the features individually, and put them together into sensible further combinations.

BRIEF DESCRIPTION OF THE DRAWINGS

Wherein.

DETAILED DESCRIPTION OF EXEMPLARY EMBODIMENTS OF THE PRESENT INVENTION

Figure 1:
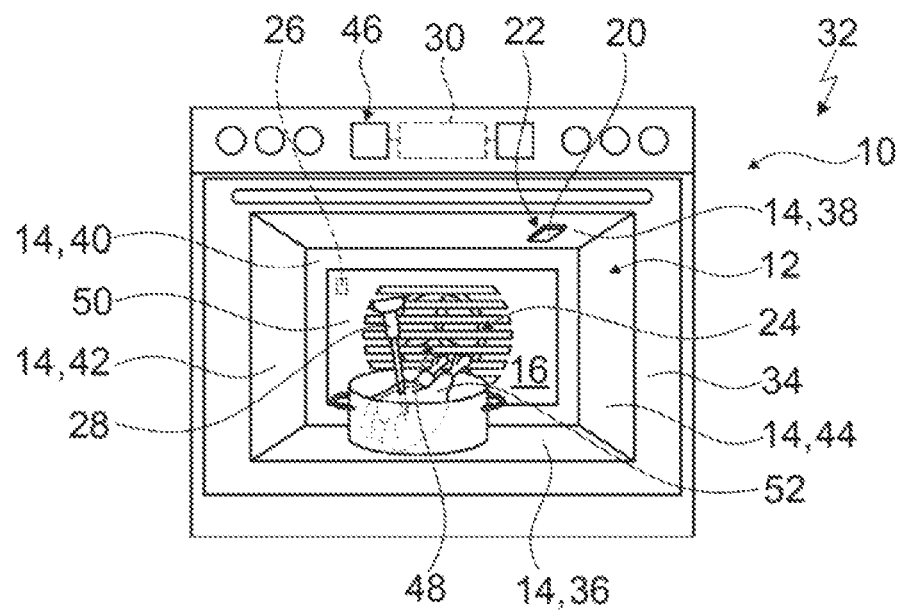
FIG. 1 shows a cooking appliance with a cooking appliance device in a schematic representation.

FIG. 1 shows a cooking appliance 32 which is embodied as an induction cooking appliance, with a cooking appliance device 10 which is embodied as an induction cooking appliance device. The cooking appliance 32 could for example be embodied as a grill appliance and/or as a steam cooking appliance and/or as a microwave appliance. In the present exemplary embodiment the cooking appliance 32 is embodied as an induction oven. The cooking appliance device 10 is embodied as an induction oven device.

The cooking appliance device 10 has a muffle 12. The muffle 12 partially defines a cooking chamber 16. In an operating status, the muffle 12, together with a cooking appliance door 34, essentially defines the cooking chamber 16. The cooking appliance device 10 has the cooking appliance door 34.

The muffle 12 has five muffle walls 14. In the figures, objects present on a multiple basis are provided with a single reference character only. In the operating status, the muffle walls 14, together with the cooking appliance door 34, essentially define the cooking chamber 16.

One of the muffle walls 14 is embodied as a muffle bottom wall 36. One of the muffle walls 14 is embodied as a muffle top wall 38. One of the muffle walls 14 is embodied as a muffle rear wall 40. Two of the muffle walls 14 are embodied as a muffle side wall 42, 44. Only one of the muffle walls 14 is described below.

The cooking appliance device 10 has an operator interface 46 for entering and/or selecting operating parameters (cf. FIG. 1), for example a heating capacity and/or a heating power output density and/or a heating zone. The operator interface 46 is provided to output the value of an operating parameter to an operator.

The cooking appliance device 10 has a control unit 30. The control unit 30 is provided to perform actions and/or change settings, depending upon operating parameters entered by means of the operator interface 46. In an operating status, the control unit 30 regulates the feeding of energy to at least one heating element 18 (cf. FIG. 2).

In the present exemplary embodiment the cooking appliance device 10 has two heating elements 18. Alternatively, the cooking appliance device 10 could in particular have a different number of heating elements 18. For example the cooking appliance device 10 could have precisely one single heating element 18. Alternatively, the cooking appliance device 10 could for example have at least three, in particular at least four, advantageously at least five and preferably multiple heating elements 18.

In an operating status the heating elements 18 are arranged outside the cooking chamber 16. A lower heating element 18 of the heating elements 18 is arranged in an installation location underneath the muffle wall 14 embodied as the muffle bottom wall 36. The lower heating element 18 is arranged on the muffle wall 14 embodied as the muffle bottom wall 36.

An upper heating element 18 of the heating elements 18 is arranged in an installation location above the muffle wall 14 embodied as a muffle top wall 38. The upper heating element 18 is arranged on the muffle wall 14 embodied as the muffle top wall 38.

Alternatively, at least one heating element 18 could be arranged on a muffle wall 14 embodied as a muffle side wall 42, 44 and/or on a muffle wall 14 embodied as a muffle rear wall 40. Only one of the heating elements 18 is described below.

The heating element 18 is provided for heating the muffle wall 14, on which the heating element 18 is arranged. In the present exemplary embodiment the heating element 18 heats the muffle wall 14 inductively. The heating element 18 is embodied as an induction heating element.

Figure 2:
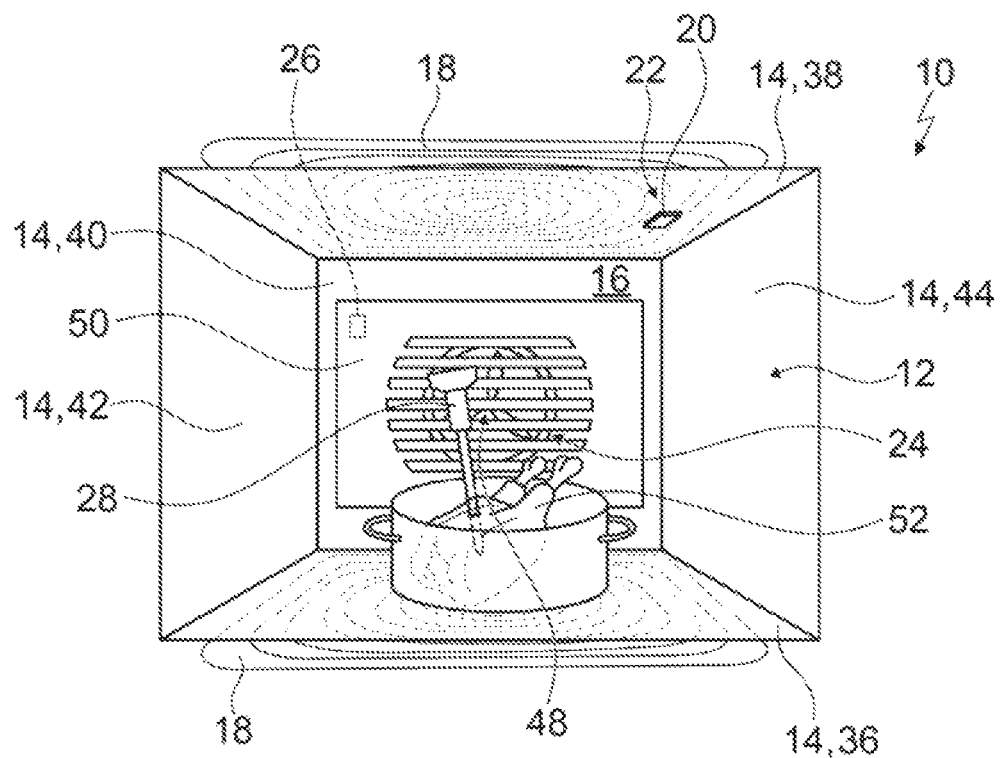
FIG. 2 shows a muffle delimiting a cooking chamber, a resistance heating element, a fan unit and two induction heating elements of the cooking appliance device in a schematic representation

The cooking appliance device 10 has a fan unit 48 (cf. FIGS. 1 and 2). The fan unit 48 has a fan rotatable about an axis of rotation. In the operating status the fan unit 48 generates a fluid flow by means of the fan. In the operating status the fan unit 48 circulates fluids located within the cooking chamber 16.

Viewed from the front, the fan unit 48 is arranged in a rear area of the cooking chamber 16. The fan unit 48 is arranged in the vicinity of the muffle rear wall 40.

The cooking appliance device 10 has a cooking appliance rear wall 50. The cooking appliance rear wall 50 is arranged within the cooking chamber 16. Viewed from the front, the cooking appliance rear wall 50 is arranged in front of the fan unit 48. The cooking appliance rear wall 50 is arranged in the vicinity of the muffle rear wall 40.

The cooking appliance device 10 has a further heating element 24 (cf. FIGS. 1 and 2). The further heating element 24 is embodied as a resistance heating element. Viewed from the front the heating element 24 is arranged behind the cooking appliance rear wall 50. The heating element 24 is arranged in the vicinity of the muffle rear wall 40. The heating element 24 is arranged in the vicinity of the fan unit 48.

The cooking appliance device 10 has a sensor unit 20 (cf. FIGS. 1 and 2). The sensor unit 20 is arranged on the muffle wall 14. In the present exemplary embodiment the sensor unit 20 is arranged within the cooking chamber 16. The sensor unit 20 is provided for detection of a temperature of the muffle wall 14.

In the operating status the sensor unit 20 detects a temperature of the muffle wall 14 at a hottest point 22 of the muffle wall 14. The sensor unit 20 is arranged at the hottest point 22 of the muffle wall 14. In the present exemplary embodiment the sensor unit 20 has a detector embodied as a resistance sensor.

The cooking appliance device 10 has a second sensor unit 26 (cf. FIGS. 1 and 2). The second sensor unit 26 is arranged within the cooking chamber 16. Viewed from the front, the second sensor unit 26 is arranged behind the cooking appliance rear wall 50. The second sensor unit 26 is arranged in the vicinity of the muffle rear wall 40. In the operating status the second sensor unit 26 detects a temperature within the cooking chamber 16. In the operating status the second sensor unit 26 detects a temperature of a fluid located within the cooking chamber 16.

The cooking appliance device 10 has a third sensor unit 28 (cf. FIGS. 1 and 2). The third sensor unit 28 is arranged within the cooking chamber 16. In the operating status the third sensor unit 28 detects a temperature of an item to be cooked 52 located within the cooking chamber 16. The third sensor unit 28 has a detector embodied as a probe. In the operating status the sensor unit 28 is arranged partially within the item to be cooked 52. Alternatively, an embodiment which avoids the third sensor unit 28 is conceivable. In particular the control unit 30 could estimate a temperature of an item to be cooked 52 located within the cooking chamber 16, for example on the basis of the temperature detected by the sensor unit 20 and/or the temperature detected by the second sensor unit 26.

In the operating status the third sensor unit 28 wirelessly transmits a value for the temperature of the item to be cooked 52 located within the cooking chamber 16 to the control unit 30. Alternatively or additionally the sensor unit 28 could in particular be connected to the control unit 30, in particular via an electrical cable, and in particular transmit a value for the temperature of the item to be cooked 52 located within the cooking chamber 16 via the connection to the control unit 30.

In the operating status the control unit 30 determines the power output directed onto the item to be cooked 52 located within the cooking chamber 16. In the operating status the control unit 30 determines the power output directed onto the item to be cooked 52 located within the cooking chamber 16, depending upon the temperature detected by the sensor unit 20.

In the operating status the control unit 30 takes account of the temperature detected by the second sensor unit 26 when determining the power output directed onto the item to be cooked 52 located within the cooking chamber 16. In the operating status the control unit 30 takes account of the temperature detected by the third sensor unit 28 when determining the power output directed onto the item to be cooked 52 located within the cooking chamber 16.

In the operating status the control unit 30 determines power output directed the item to be cooked 52 located within the cooking chamber 16 in different operating modes, depending upon temperatures detected by different sensor units 20. 26, 28. In the present exemplary embodiment the control unit 30 differentiates between three operating modes. Alternatively, the control unit 30 could distinguish a greater number of operating modes.

In a convection operating mode, the control unit 30 takes account of the power output based upon convection when determining the power output directed onto the item to be cooked 52 located within the cooking chamber 16. In the convection operating mode the control unit 30 broadly proceeds on the assumption that the power output directed onto the item to be cooked 52 located within the cooking chamber 16 is essentially based on convection. In the convection operating mode the further heating element 24 and the fan unit 48 are activated and in particular the heating element 18 deactivated.

In the convection operating mode the control unit 30 uses the following formula as an initial basis for determining the power output directed onto the item to be cooked 52 located within the cooking chamber 16:

$$\dot{Q}_{conv} = h \cdot A_{conv} \cdot (T_{air} - T_{food}),$$

Herein h is a coefficient of convection, which in particular is dependent upon a flow rate of a fluid located in the cooking chamber 16 and on a temperature of a fluid located in the cooking chamber 16. $A_{conv}$ is a surface of the item to be cooked 52 located within the cooking chamber 16. $T_{air}$ is the temperature detected by the second sensor unit 26. $T_{food}$ is the temperature detected by the third sensor unit 28.

The control unit 30 in the convection operating mode uses the following formula for determining the power output directed onto the item to be cooked 52 located within the cooking chamber 16:

$$\dot{Q}_{conv} = k_{conv} \cdot (T_{air} - T_{food}),$$

Herein $k_{conv}$ is a known coefficient, which in particular is stored in a memory unit of the control unit 30 and which in particular can be determined by means of experimental trials and/or by means of theoretical calculations.

In a thermal radiation operating mode the control unit 30 takes account of the power output based upon thermal radiation when determining the power output directed onto the item to be cooked 52 located within the cooking chamber 16. In the thermal radiation operating mode, the control unit 30 broadly proceeds from the assumption that the power output directed onto the item to be cooked 52 located within the cooking chamber 16 is based essentially on thermal radiation. In the thermal radiation operating mode the heating element 18 is activated and in particular the further heating element 24 and the fan unit 48 deactivated.

It is assumed in the following, with no loss of generality, that the heating element 18 heats the muffle wall 14 embodied as the muffle top wall 38. Alternatively, the heating element 18 could heat at least one other muffle wall 14, such as for example the muffle wall 14 embodied as the muffle bottom wall 36, wherein in particular the following examination may be used analogously.

In the thermal radiation operating mode the control unit 30 uses the following formula as an initial basis for determining the power output directed onto the item to be cooked 52 located within the cooking chamber 16:

$$\dot{Q}_{rad} = \sigma \cdot \varepsilon \cdot A_{top} \cdot F \cdot (T_{top}^4 < T_{food}^4)$$

Herein $\sigma$ is a Stefan-Boltzmann constant. $\varepsilon$ is the emissivity of the muffle wall 14. $A_{top}$ is a surface of the muffle wall 14 in particular embodied as a muffle top wall 38. F is a factor, which is dependent on the geometry of the muffle 12. $T_{top}$ is the temperature detected by the sensor unit 20. $T_{food}$ is the temperature detected by the third sensor unit 28.

In the thermal radiation operating mode the control unit 30 uses the following formula for determining the power output directed onto the item to be cooked 52 located within the cooking chamber 16, which in particular represents an in particular satisfactory approximation of the formula used as the initial basis:

$$\dot{Q}_{rad} \approx k_{rad} \cdot (T_{top} - T_{food})$$

Herein $k_{rad}$ is a known coefficient, which in particular is stored in a memory unit of the control unit 30 and which in particular can be determined by means of experimental trials and/or by means of theoretical calculations.

The emissivity of the muffle wall 14 is considered in the known coefficients. In the operating status the control unit 30 takes account of an emissivity of the muffle wall 14 when determining the power output directed onto the item to be cooked 52 located within the cooking chamber 16.

In a mixed operating mode the control unit 30 takes account of a power output based upon thermal radiation and a power output based upon convection when determining the power output directed onto the item to be cooked 52 located within the cooking chamber 16. In the mixed operating mode the heating element 18, the further heating element 24 and the fan unit 48 are activated.

The control unit 30 could for example take account of the power output based upon thermal conduction in at least one operating mode, in particular in the convection operating mode and/or in the thermal radiation operating mode and/or in the mixed operating mode, when determining the power output directed onto the item to be cooked 52 located within the cooking chamber 16. In the present exemplary embodiment the control unit 30 ignores the power output based upon thermal conduction when determining the power output directed onto the item to be cooked 52 located within the cooking chamber 16.

For example in the thermal radiation operating mode the control unit 30 could in addition take account of a convection, in particular a natural convection, when determining the power output directed onto the item to be cooked 52 located within the cooking chamber 16. The thermal radiation operating mode could for example be a grill operating mode.

In one method for operating the cooking appliance device 10 in the operating status a temperature of the muffle wall 14 is measured. Depending upon the temperature of the muffle wall 14, the power output directed onto the item to be cooked 52 located within the cooking chamber 16 is determined.

Figure 3:
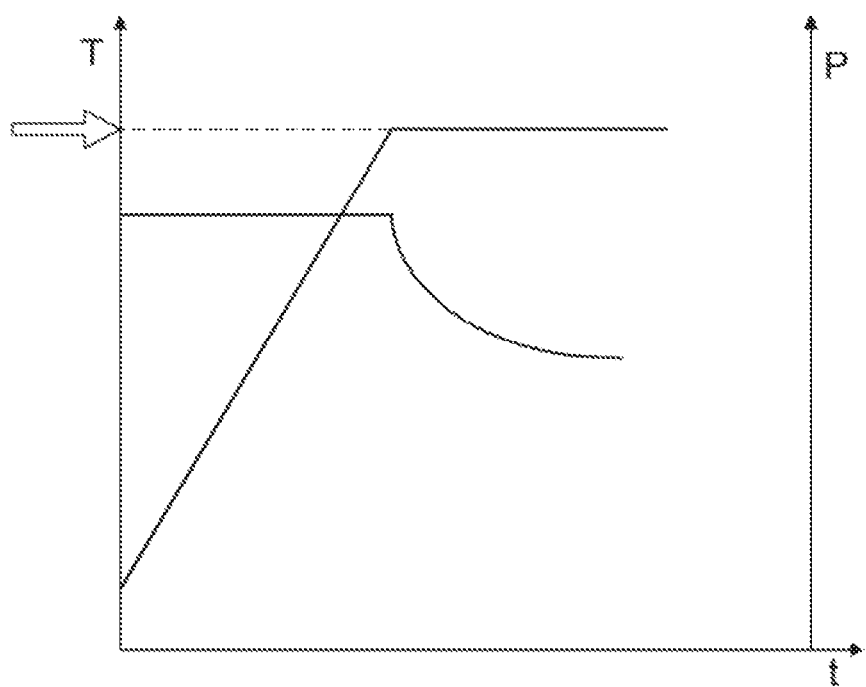
FIG. 3 shows a schematic diagram in which a temperature and a power output are plotted against a time.

In the operating status the control unit 30 uses the temperature within the cooking chamber 16 detected by the second sensor unit 26 and/or the temperature detected by the sensor unit 20 for safety purposes. A reference value for the temperature detected by the second sensor unit 26 and/or by the sensor unit 20 is stored in a memory unit of the control unit 30. The reference value for the temperature detected by the second sensor unit 26 and/or by the sensor unit 20 indicates a maximum permissible temperature within the cooking chamber 16. In the operating status the control unit 30 reduces the power output directed onto the heating element 18 and/or the further heating element 24 as soon as the temperature detected by the second sensor unit 26 and/or by the sensor unit 20 reaches the reference value (cf. FIG. 3). In this case the control unit 30 controls and/or regulates the temperature within the cooking chamber 16 and/or the temperature of the muffle wall 14 to correspond to the reference value.

For example at least one further operating mode, in particular in addition to the operating modes described, could be stored in a memory unit of the control unit 30, in which the control unit 30 could in particular operate the heating element 18 and/or the further heating element 24 depending upon a temperature within the cooking chamber 16.

REFERENCE CHARACTERS

10 Cooking appliance device
12 Muffle
14 Muffle wall
16 Cooking chamber
18 Heating element
20 Sensor unit
22 Hottest point
24 Further heating element
26 Second sensor unit
28 Third sensor unit
30 Control unit
32 Cooking appliance
34 Cooking appliance door
36 Muffle bottom wall
38 Muffle top wall
40 Muffle rear wall
42 Muffle side wall
44 Muffle side wall
46 Operator interface
48 Fan unit
50 Cooking appliance rear wall
52 Item to be cooked

The invention claimed is:

1. An induction cooking appliance device, comprising:
   a muffle having a muffle wall and configured to define at least partially a cooking chamber;
   a heating element configured to heat the muffle wall;
   a first sensor unit configured to detect a temperature of the muffle wall, wherein the first sensor unit is configured to detect the temperature of the muffle wall automatically at a hottest point of the muffle wall;
   a second sensor unit configured to detect a temperature of air in the cooking chamber;
   a control unit configured to compare the temperature detected by the first sensor unit with a stored reference value indicating a maximum permissible temperature within the cooking chamber, and, in response to the temperature detected by the first sensor unit reaching the reference value, to reduce a power level of the heating element; and
   wherein the control unit is further configured to determine a power output directed to an item to be cooked in a first operating mode based on the temperature detected by the first sensor unit, and to determine the power output directed to the item to be cooked in a second operating mode based on the temperature detected by the second sensor unit.

2. The cooking appliance device of claim 1, wherein the heating element is embodied as an induction heating element.

3. The cooking appliance device of claim 1, further comprising a further heating element embodied as a resistance heating element.

4. The cooking appliance device of claim 1, further comprising a third sensor unit configured to detect a temperature of the item to be cooked located within the cooking chamber.

5. The cooking appliance device of claim 1, wherein the control unit is configured to consider an emissivity of the muffle wall when determining the power output directed onto the item to be cooked located within the cooking chamber.

6. The cooking appliance device of claim 1, further comprising:
   a third sensor unit configured to detect a temperature of the item to be cooked located within the cooking chamber;
   wherein the control unit is configured to determine, in dependence on the temperature detected by the third sensor unit, the power output that is directed onto the item to be cooked located within the cooking chamber in the first and second operating modes.

7. The cooking appliance device of claim 6, wherein the control unit is configured to consider an emissivity of the muffle wall when determining the power output directed onto the item to be cooked located within the cooking chamber.

8. An induction cooking appliance, comprising:
   a cooking appliance device, said cooking appliance device comprising a muffle having a muffle wall and configured to define at least partially a cooking chamber;
   an induction heating element configured to heat the muffle wall;
   a resistance heating element;
   a first sensor unit configured to detect a temperature of the muffle wall, wherein the first sensor unit is configured to detect the temperature of the muffle wall automatically at a hottest point of the muffle wall;
   a second sensor unit configured to detect a temperature of air within the cooking chamber;
   a control unit configured to compare the temperature detected by the first sensor unit with a stored reference value indicating a maximum permissible temperature within the cooking chamber, and to reduce a power level of the induction heating element in response to the temperature detected by the first sensor unit reaching the reference value; and wherein the control unit is configured to determine a power output directed to an item to be cooked in two different operating modes:

(a) a convection operating mode, wherein the resistance heating element and a fan of the induction cooking appliance are activated and wherein the induction heating element is deactivated, and wherein the control unit determines the power output based on the temperature determined by the second sensor unit; and (b) a thermal radiation operating mode, wherein the induction heating element is activated, and wherein the resistance heating element and the fan are deactivated, and wherein the control unit determines the power output based on the temperature determined by the first sensor unit.

9. The cooking appliance device of claim 8, wherein the cooking appliance device includes a third sensor unit configured to detect a temperature of the item to be cooked located within the cooking chamber.

10. The cooking appliance device of claim 8, wherein the control unit is configured to consider an emissivity of the muffle wall when determining the power output directed onto the item to be cooked located within the cooking chamber.

11. The cooking appliance device of claim 8, wherein the cooking appliance device includes a third sensor unit configured to detect a temperature of the item to be cooked located within the cooking chamber, and a control unit configured to determine, in dependence on the temperature detected by the third sensor unit, the power output that is directed onto an item to be cooked located within the cooking chamber in the convection operating mode and in the thermal radiation operating mode.

12. The cooking appliance device of claim 11, wherein the control unit is configured to consider an emissivity of the muffle wall when determining the power output directed onto the item to be cooked located within the cooking chamber.

13. A method for operating an induction cooking appliance device having a muffle, a heating element, and a control unit, said method comprising:

measuring in at least one operating status a temperature of a muffle wall of the muffle as the muffle wall is heated by the heating element, wherein the temperature is automatically measured at the hottest point of the muffle wall;

comparing the measured temperature of the muffle wall with a stored reference value indicating a maximum permissible temperature of the muffle wall;

determining, by the control unit, a power output directed to an item to be cooked in a first operating mode based on the measured temperature of the muffle wall;

determining, by the control unit, the power output directed to the item to be cooked in a second operating mode based on a measured temperature of air within a cooking chamber defined by the muffle; and reducing, by the control unit, a power level of the heating element in response to the measured temperature of the muffle wall reaching the reference value.

14. The cooking appliance of claim 8, further comprising a third sensor unit configured to detect a temperature of the item to be cooked located within the cooking chamber.

15. The cooking appliance of claim 14, wherein the control unit is configured to determine the power output based on the temperature detected by the third sensor unit in both the convection operating mode and the thermal radiation operating mode.

* * * * *